Nov. 5, 1968     J. GACHOT     3,409,268
BALL VALVE
Filed July 15, 1965     5 Sheets-Sheet 1
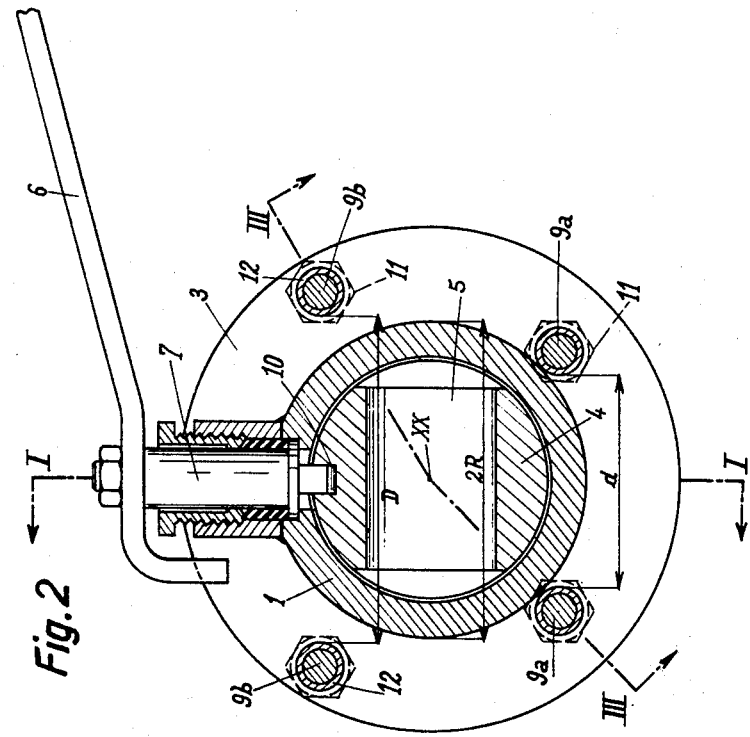
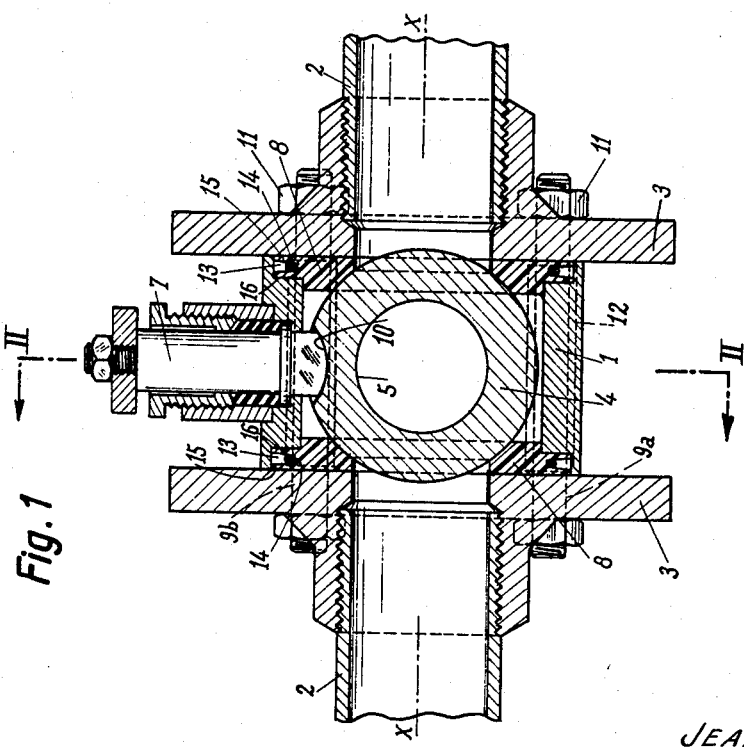
INVENTOR
JEAN GACHOT
By Young & Thompson
ATTYS.

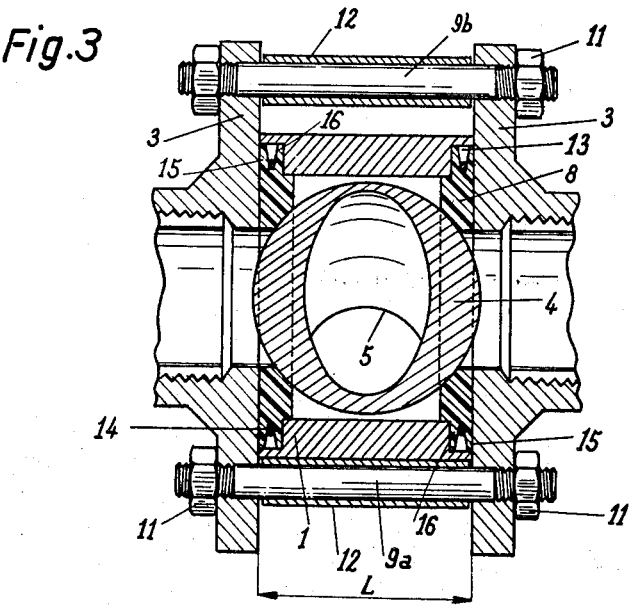
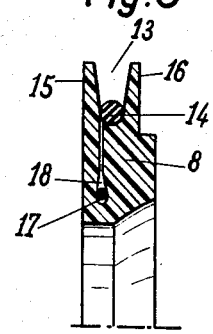
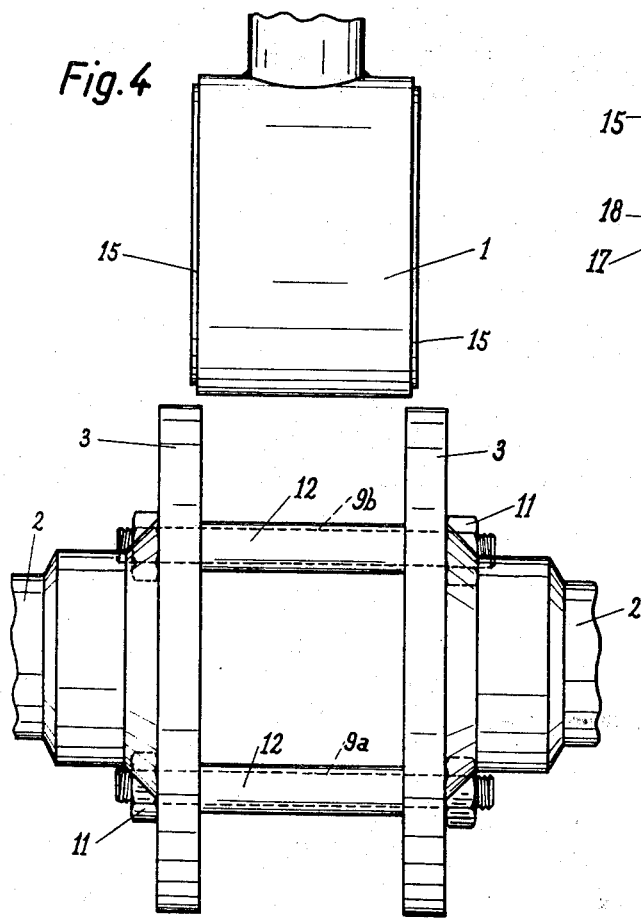

Nov. 5, 1968   J. GACHOT   3,409,268
BALL VALVE
Filed July 15, 1965   5 Sheets-Sheet 4

INVENTOR
JEAN GACHOT
BY Young + Thompson
ATTYS.

United States Patent Office
3,409,268
Patented Nov. 5, 1968

3,409,268
BALL VALVE
Jean Gachot, 179 Ave. de la Division Leclerc,
Enghien-les-Bains, Seine-et-Oise, France
Filed July 15, 1965, Ser. No. 472,140
Claims priority, application France, Aug. 6, 1964,
984,343; Apr. 30, 1965, 15,318
6 Claims. (Cl. 251—148)

ABSTRACT OF THE DISCLOSURE

In a ball valve having a spherical ball plug and a tubular valve body for the plug, tie bolts extend between and interconnect the flanges of the conduit on either side of the valve. The tie bolts are so spaced on the outside of the tubular valve body that the lower two of them support the valve body, while the others are spaced apart a distance greater than the outer diameter of the valve body so that the valve body can be removed without removing more than one tie bolt. Sleeves surround the tie bolts and have a length slightly less than the axial dimension of the valve body, so as to support the opposed flanges when the valve body is removed.

---

This invention relates to an improved ball valve. As is generally known, this is the term given to a valve in which the closing member consists of a spherical plug which is pierced by a diametral passageway and capable of rotating between two flexible seals about an axis at right angles to that of the passageway.

The advantage of valves of this type lies among others in their ease of manufacture and assembly.

It is known in particular to mount the valve body between the two flanges of a pipe and to secure said valve body in position by means of four bolts inserted through the pipe-flanges and through bores formed for this purpose in said body. The fixing of the valve is thus particularly expeditious. However, when the valve is demounted by removing the bolts which pass through the valve body, the pipes are no longer held and can thus be subjected to dangerous bending stresses. It is therefore necessary to make provision for the attachment of the valve by means of supports or brackets which are anchored in a wall. The primary object of this invention is therefore to circumvent this drawback.

Secondly, it is an advantage in ball valves to make use of sealing gaskets of polytetrafluoroethylene which are fitted between the ball and the flanges. In fact, this material has remarkable properties both of leak-tightness and thermal resistance as well as resistance to deleterious agents. However, it has the disadvantage of being non-elastic and of creeping with time under the action of pressure and temperature variations, with the result that the joints thus formed are eventually subject to leakage. Another object of this invention is therefore to overcome these disadvantages.

In accordance with the invention, the ball valve in which the spherical plug is housed within a valve body, said valve body being clamped by tie-bolts between the two flanges of a pipe with interposition of sealing gaskets, is characterized in that the tie-bolts join the pipe-flanges together without passing through said body and in that two of said tie-bolts are positioned with an internal spacing which is smaller than the width of the valve body and serve as supports for the centering of said body, and that two other tie-bolts are positioned with an internal spacing which is greater than the width of said valve body and permit said body to be withdrawn after unclamping.

As a preferred feature, the tie-bolts are surrounded by sleeves each having a length which is slightly smaller than the width of the valve body and serving to hold the pipe-flanges applied one against the other after removal of the valve.

The advantage of a valve of this type lies in the fact that it can be mounted and demounted very rapidly between the joints of a pipe without requiring any welding operation or fixing bolts which would leave the pipe completely disconnected.

In the case in which the diameter of the valve becomes substantial, the fixing of the pipe-flanges by means of four tie-bolts proves inadequate for the purpose of producing a suitable clamping pressure. Furthermore, the two supporting tie-bolts can also prove to be inadequate for the purpose of ensuring the accurate positioning of the valve body. In this case, the invention contemplates the provision, between two of the tie-bolts whose internal spacing is greater than the width of the valve body and which are not in contact therewith, for a third tie-bolt which bears tangentially against the valve body and thus permits the keying of said body.

According to a preferred arrangement, the keying tie-bolt is placed on the side opposite to those two tie-bolts whose internal spacing is smaller than the width of the valve body.

At the time of disassembly, it is necessary to pull out the tie-bolt completely along its axis, with the result that provision has to be made on either side of the pipe-flanges for a clearance having a depth at least equal to the length of the tie-bolt. However, this can constitute a serious drawback in the case of certain installations in which only very limited space is available on the other side of the flanges.

Accordingly, the keying tie-bolt, and possibly also the other tie-bolts, each consist of a rod whose ends form two internally threaded sockets in which are screwed clamping bolts which are provided for the pipe-flanges.

Further characteristic features of the invention, as applicable especially to the design of sealing gaskets specially adapted to demountable ball valves of the type considered, will be brought out by the description which now follows below.

In the accompanying drawings, which are given solely by way of example and not in any limiting sense:

FIG. 1 is an axial sectional view taken along the line I—I of FIG. 2 and showing a first form of embodiment of valve.

FIG. 2 is a transverse sectional view taken along the line II—II of FIG. 1.

FIG. 3 is a sectional view along two half axial planes and taken along the line III—III of FIG. 1.

FIG. 4 is a longitudinal elevation of the pipe, the valve being assumed to have been withdrawn from the pipe.

FIG. 5 is a transverse sectional view showing an alternative form of the sealing gasket.

Figure 6:
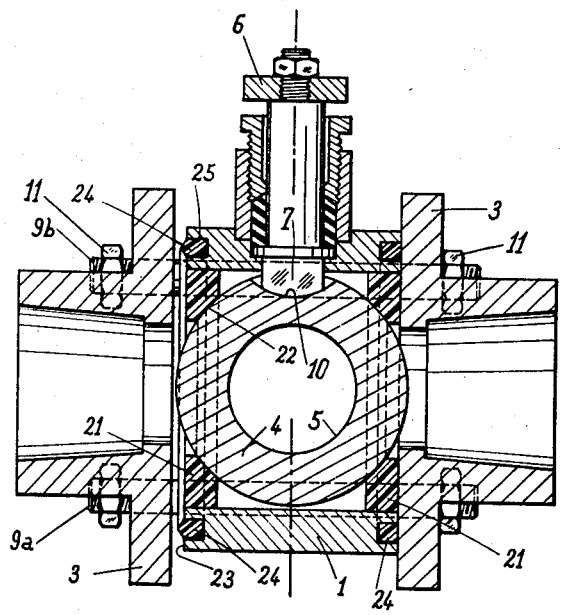
FIG. 6 is a sectional view on a diametral plane and showing a further form of embodiment of the valve as seen prior to clamping in position on the left hand side of the figure and after clamping in position on the right hand side of the figure.

Referring now to FIGS. 1 to 3, there can be seen at 1 the valve body which has a cylindrical configuration and which assumed to be mounted in a pipe 2, said pipe being connected by means of flanges 3 which project radially with respect to said valve body 1. The valve plug or valve proper consists of a ball 4 which is pierced by an axial passageway 5. The operation of the valve is carried out by means of a lever 6 rigidly fixed to a key 7 which is fitted within a slot 10 of the ball 4. Leak-tightness between the ball 4 and the flanges 3 is ensured by means of annular sealing gaskets 8 which are held by two pairs of tie-bolts 9a, 9b, the threaded ends of which are fitted with nuts 11.

In accordance with the present invention, the tie-bolts are placed at different distances from the valve center-line X—X. In the example described, the two lower tie-bolts 9a are located at a relative spacing d which is smaller than the external diameter 2R of the valve body 1. On the contrary, the two upper tie-bolts 9b have a relative spacing D which is larger than 2R (as shown in FIG. 2).

The tie-bolts are jacketed between the flanges 3 by means of sleeves 12, the length of which is very slightly smaller than the width L of the valve body 1 (corresponding to the spacing of the flanges 3). Consequently, the internal clearance d and D referred-to above must take into account the thickness of the sleeves 12.

The annular sealing gaskets 8 can be formed of polytetrafluoroethylene or any other sealing material which is flexible but not elastic and in particular not liable to creep in time. There is formed in each gasket an annular groove 13 in which is fitted an O-ring seal 14, for example of elastic material such as natural or synthetic rubber which is in contact with the two flexible annular flanges 15, 16 formed on each side of the groove 13.

When in service, the valve body 1 is clamped by the nuts 11 between the flanges 3. Said valve body is applied at the bottom against the sleeves 12 of the tie-bolts 9a which thus ensure the centering of the body relatively to the axis X—X after the fashion of a cradle. The O-ring seals 14 which are compressed by the pipe-flanges 3 apply the annular flanges 15 against the pipe flange walls, thus producing by virtue of their elasticity the requisite pressure for ensuring leak-tightness even in the event of creep of the material of the gaskets 8.

In order to remove the valve, it is merely necessary to slacken off the nuts 11. The pipe-flanges 3 are separated to a sufficient extent to allow the valve body 1 to pass out without any further dismantling (as shown in FIG. 4). Once this armature has been withdrawn, it is merely necessary to tighten up the nuts 11 again. The pipe-flanges 3 then bear against the sleeves 12 which serve as distance pieces. Thus, no support is required for the pipe, the sections of which are secured to each other as effectively as if the valve were in position.

It will be observed that the annular flange 15 of each gasket 8 serves to protect the O-ring seal 14 against any contact with the fluid which passes through the valve, with the result that said O-ring seal thus endows the gasket with the requisite degree of elasticity while being protected by this latter from any deleterious fluids which may pass through the valve.

In the version of FIG. 5, the gasket 8 contains two elastic O-ring seals 14 and 17. The O-ring seal 17 which has the smaller diameter is fitted within an annular cut 18 which is formed in the groove 13 near the center of this latter in such a manner as to undercut the annular flange 15 to a substantial extent, said annular flange being thus applied against the pipe-flange by means of two concentric rings of different diameters, thereby ensuring perfect leak-tightness at the joint.

In the case of a valve which is fitted with gaskets 8 in accordance with either one or the other of the preceding versions it is necessary, however, to replace the O-ring seals from time to time.

This requirement is particularly marked in the case of valves of large caliber in which the annular gaskets are of substantial volume and are liable to deform in time, above all if they are formed of a plastic material which is liable to creep under pressure such as polytetrafluoroethylene. Such a tendency to creep is exhibited especially in the event of temperature variation since the gasket expands and does not subsequently revert to its initial position.

The object of this invention is to overcome these disadvantages by providing at each end of the valve two annular gaskets, one of said gaskets being in contact with the ball and the other gasket which is fitted within the valve body being provided with a portion which projects towards the corresponding pipe-flange in the rest position. Said projecting portion is thus flattened by compression when the pipe-flanges are clamped against the valve body, thereby ensuring excellent fluid-tightness, even at high pressure.

As a preferable feature, the outer annular gasket which is fitted in the valve body presents in the rest position a portion forming a chamfered projection relatively to the corresponding lateral face of said valve body, the arris of said chamfer being directed towards the oppositely facing pipe-flange.

An arrangement of this kind is applied in the form of embodiment of FIG. 6, wherein provision is made on each side of the valve body 1 for two annular sealing gaskets formed, for example, of polytetrafluoroethylene or plastic material having similar characteristics. The inner gasket 21 is in contact with the ball 4 by virtue of a spherical bearing surface 22. In the rest position, sais gasket practically does not project with respect to that face 23 of the valve body 1 which is directed towards the corresponding pipe-flange 3.

The other gasket 24 is fitted within an annular groove 25 of the face 23. In the rest position, said gasket 24 has a chamfered projecting portion relatively to the plane of the face 23. Said projecting portion is oriented in such a manner that the circular arris thereof is directed towards the corresponding pipe-flange 3.

When the pipe-flanges 3 are brought to bear against the corresponding faces 23 of the valve body 1 by tightening of the nuts 11, the sealing gaskets 24 are flattened by compression (as shown in the right hand portion of FIG. 1). There is thus obtained a very effective joint plane. Experience shows that the valve can be demounted a number of times without any need to replace the sealing gasket.

When the valve is intended to be fitted in a pipe having a large cross-sectional area, the annular gasket which is in contact with the ball is advantageously supported on a washer which is carried by the valve body; in addition, that portion of the gasket which is located opposite the pipe-flange can project from the lateral face of the valve body in the rest position.

Figure 7:
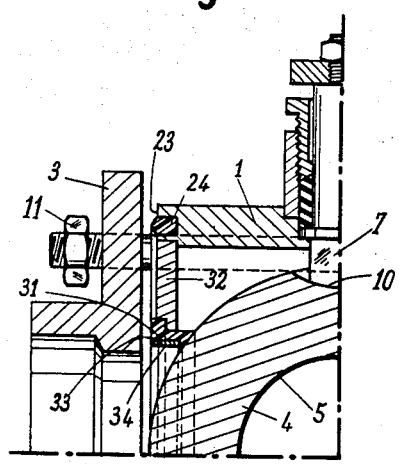
FIG. 7 is a partial sectional view showing another form of embodimnt prior to clamping in position.

An arrangement of this kind is applied to the embodiment of FIG. 7. The outer gasket 24 is not modified in this case. On the other hand, the inner gasket 31, instead of bearing on the valve body 1, is supported on a washer 32 which is formed, for example, of stainless steel, said washer being in turn set in the valve body 1. Moreover, the gasket 31 is preferably designed in such a manner that the front face 33 thereof projects from the face 23 of the valve body 1. Finally, provision is made for a metallic ring 34 which maintains the gasket 31 against its internal periphery. Said ring can simply be applied against the gasket or set in this latter as illustrated, in which case the assembly can readily be performed in the hot state.

Under these conditions, when the pipe-flange 3 considered is clamped against the face 23, the annular gaskets 24 and 31 are both compressed at the same time and two annular coaxial joint planes are formed, thus increasing leak-tightness to a substantial extent. It can be seen in addition that, by virtue of the ring 32, valves of substantial size can be fitted without correspondingly increasing the size of the ring 31. The effect produced by the ring 34 is to prevent any creep towards the axis of this latter.

Figure 8:
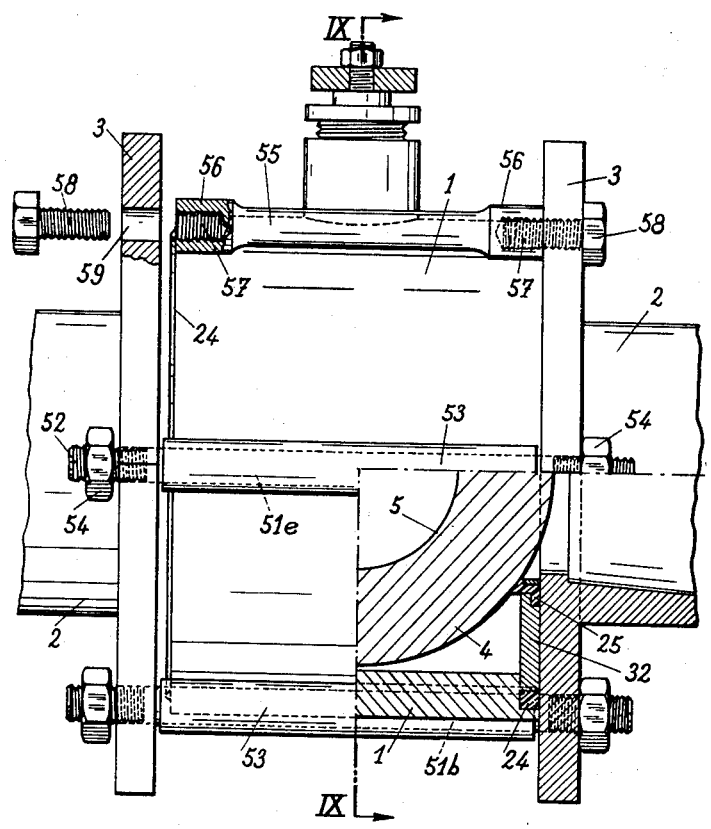
FIG. 8 is a view in side elevation of still another form of embodiment, the valve being only partially mounted and seen in partial cross-section along the line VIII—VIII of FIG. 9.
Figure 9:
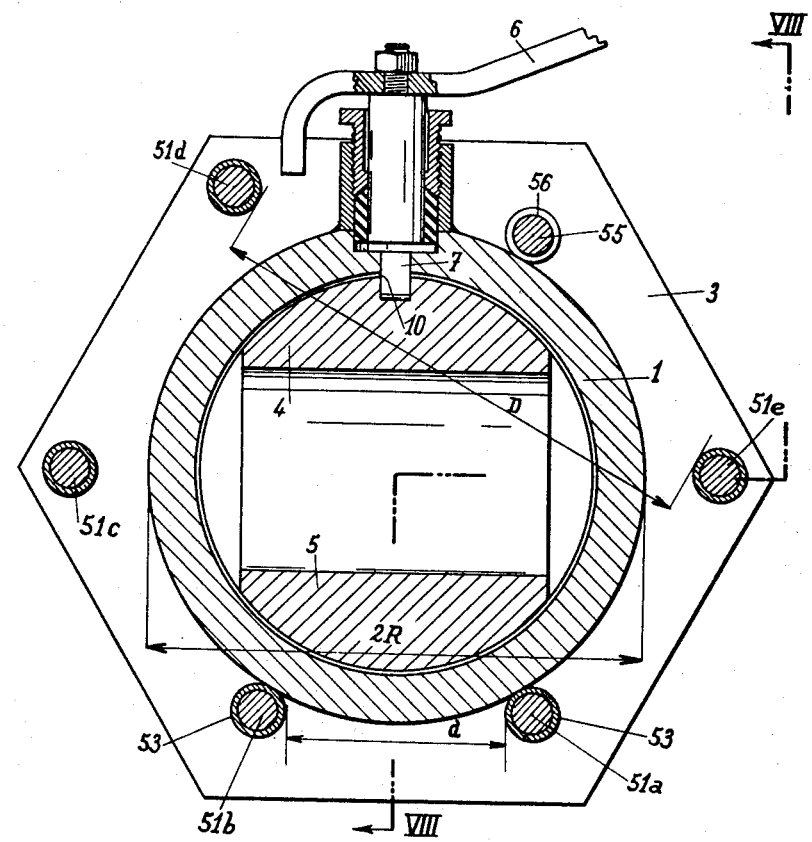
FIG. 9 is a transverse sectional view of the valve, this view being taken along the line IX—IX of FIG. 8.

The embodiment of FIGS. 8 and 9 shows a preferred arrangement of large-diameter ball valves. The valve is provided in this case with six tie-bolts, five of which consist of rods 51 having threaded ends 52 which pass through the pipe-flanges 3 and which are inserted within sleeves 53. Clamping action is produced by nuts 54.

The tie-bolts 51 are disposed around the valve body 1 as shown in FIG. 9. Two tie-bolts 51a, 51b are mounted with a relative internal spacing d which is smaller than the diameter 2R of the valve body 1 which bears on the corresponding sleeves 53.

Three other tie-bolts 51c, 51d, 51e are set at a distance from the axis which is greater than the tie-bolts referred-to above and the two tie-bolts 51d, 51e are such that a spacing D is provided therebetween which is greater than 2R.

Provision is made between the tie-bolts 51d, 51e for a sixth tie-bolt 55 having two enlarged sockets 56 in which are formed internal screw-threads 57. Said internal screw-threads are intended to receive bolts 58 which pass through drilled holes 59 of the pipe-flanges 3.

The dimensions of the device are so calculated that, when once the tie-bolt 55 has been set in position, the enlarged portions of the sockets 56 are brought to bear on the valve body 1. Said valve body is thus keyed between the tie-bolts 51a, 51b, 55 with which it is in contact and a uniform clamping pressure can be exerted between the pipe-flanges 3.

It will be understood that, in order to demount the valve, it is merely necessary to unscrew the two bolts 58 and to slacken off the nuts 54 of the other tie-bolts. The tie-bolt 55 is then withdrawn simply by transverse withdrawal without engaging the free space which is located on each side of the pipe-flanges 3. The valve body 1 can in turn be withdrawn by passing this latter between the tie-bolts 51d, 51e.

It is therefore apparent that the valve can be removed with equal ease in spite of its large size.

As will be readily understood, it would be possible if so desired to provide any number of tie-bolts around the valve body 1 and to design all of said tie-bolts in the same manner as the tie-bolt 55 referred-to above.

What I claim is:

1. A ball valve comprising a spherical ball plug, a tubular valve body housing said ball plug, flange members providing fittings for securing said valve within a pipe, annular sealing gaskets interposed between said flange members, valve body and ball plug, said flange members extending radially beyond said valve body, and a plurality of tie bolts extending between and interconnecting said flange members outside said valve body parallel to the axis of the valve to secure said flange members and said body in sealed relationship, two of said tie bolts adjacent to each other being arranged circumferentially about said body with a relative spacing between each other which is smaller than the outer diameter of said tubular body so as to act as supports for said body while said valve is being dismantled and to provide for the centering of said body, said two tie bolts being spaced from said axis a distance equal to substantially half the outer diameter of said tubular body, two other bolts being spaced from said body with a relative spacing between them which is greater than said outer diameter of said body, said two other bolts being spaced from said axis a distance substantially greater than half the outer diameter of said tubular body, there being at most one bolt between last said two bolts on the side opposite said two supporting and centering bolts, so as to permit the removal of said body after untightening said tie bolts and removing at most one of them.

2. A valve as claimed in claim 1, and two annular sealing gaskets at at least one end of said valve body, one of said gaskets being in contact with the ball plug and the other gasket being set in said valve body and forming when the valve is dismantled a tapering projection with respect to the end face of said body and toward the flange member, wherein the gasket which is in contact with said ball plug is supported on a washer carried by said tubular body, and a metallic ring partially set within the internal periphery of said gasket.

3. A valve as claimed in claim 1 and fitted with annular sealing gaskets of polytetrafluoroethylene or like material which is flexible but not resilient, wherein said sealing gaskets are each provided with an annular groove formed at the periphery of said sealing gasket and in which it fitted a ring of resilient material, said groove forming on each side of said resilient ring one flexible annular flange, one of which is applied against a said flange member as a result of the resiliency of said ring.

4. A ball valve as claimed in claim 1, and means carried by said tie bolts to provide abutment surfaces for said flange members and keep them in mutual engagement when said valve body is removed, the axial spacing between said abutment surfaces being slightly less than the axial dimension of said tubular body.

5. A valve as claimed in claim 4, wherein said abutment surfaces are provided by sleeves surrounding said tie bolts and disposed between said radially extending parts of said flange members, said sleeves having a length slightly less than the axial dimension of said tubular body.

6. A valve as claimed in claim 4, wherein at least one of said tie bolts consists of a rod whose ends form two internally threaded sockets in which are screwed clamping bolts which are provided for the flange members, the outer diameter of the ends of said rod being such that said ends provide said abutment surfaces for said flange members.

References Cited

UNITED STATES PATENTS

| 2,740,423 | 4/1956 | Stillwagon | 137—454.2 |
| 3,056,577 | 10/1962 | Kulisek | 251—315 |
| 3,202,175 | 8/1965 | Dumm | 251—315 |

FOREIGN PATENTS

| 1,376,015 | 9/1964 | France. |

M. CARY NELSON, *Primary Examiner.*